United States Patent
Oguchi et al.

(10) Patent No.: US 10,115,318 B2
(45) Date of Patent: Oct. 30, 2018

(54) INFORMATION PROCESSING METHOD AND DEVICE

(71) Applicant: FUJITSU LIMITED, Kawasaki-shi, Kanagawa (JP)

(72) Inventors: Atsushi Oguchi, Kawasaki (JP); Miho Sakai, Yokohama (JP); Sokichi Fujita, Chiyoda (JP); Tatsuma Muramatsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 470 days.

(21) Appl. No.: 14/814,682

(22) Filed: Jul. 31, 2015

(65) Prior Publication Data
US 2016/0059106 A1 Mar. 3, 2016

(30) Foreign Application Priority Data
Aug. 27, 2014 (JP) .................................. 2014-173150

(51) Int. Cl.
| | | |
|---|---|---|
| *A63F 9/24* | (2006.01) | |
| *A63F 13/00* | (2014.01) | |
| *G06F 17/00* | (2006.01) | |
| *G06F 19/00* | (2018.01) | |
| *G09B 19/00* | (2006.01) | |
| *G06K 9/00* | (2006.01) | |
| *G06K 9/46* | (2006.01) | |
| *G06K 9/62* | (2006.01) | |

(52) U.S. Cl.
CPC ..... *G09B 19/0038* (2013.01); *G06K 9/00724* (2013.01); *G06K 9/00744* (2013.01); *G06K 9/46* (2013.01); *G06K 9/6215* (2013.01)

(58) Field of Classification Search
USPC ................. 700/92; 463/1, 20, 22, 25, 30, 39
See application file for complete search history.

(56) References Cited

U.S. PATENT DOCUMENTS

| | | | | |
|---|---|---|---|---|
| 5,769,713 A | * | 6/1998 | Katayama | .............. A63B 71/06 463/3 |
| 2008/0140232 A1 | | 6/2008 | Lee et al. | |
| 2008/0175486 A1 | * | 7/2008 | Yamamoto | ........ G06F 17/30796 382/206 |
| 2009/0208184 A1 | | 8/2009 | Takahashi | |
| 2013/0022333 A1 | | 1/2013 | Takahashi | |

FOREIGN PATENT DOCUMENTS

| | | |
|---|---|---|
| JP | 2001-331494 | 11/2001 |
| JP | 2003-264771 | 9/2003 |
| JP | 2005-295296 | 10/2005 |

(Continued)

OTHER PUBLICATIONS

Espacenet English Abstract of Japanese Publication No. 2003-264771, Published Sep. 19, 2003.

(Continued)

*Primary Examiner* — Adetokunbo O Torimiro
(74) *Attorney, Agent, or Firm* — Staas & Halsey LLP

(57) ABSTRACT

An information processing device includes a processor that executes a procedure, The procedure includes detecting a turn at bat transition based on a change in any of an out count, a runner count, or a score that have been acquired from image information indicating a game situation included in captured footage of a baseball game stored in a storage section.

18 Claims, 12 Drawing Sheets

(56) References Cited

FOREIGN PATENT DOCUMENTS

| | | |
|---|---|---|
| JP | 2007-274400 | 10/2007 |
| JP | 2007-335984 | 12/2007 |
| JP | 2008-5204 | 1/2008 |
| JP | 2008-176538 | 7/2008 |
| KR | 10-2007-0086018 | 8/2007 |
| TW | I336207 | 1/2011 |

OTHER PUBLICATIONS

Espacenet English Abstract of Japanese Publication No. 2007-274400, Published Oct. 18, 2007.
Espacenet English Abstract of Korean Publication No. 10-2007-0086018, Published Aug. 27, 2007.
Korean Office Action dated Jun. 21, 2016 in corresponding Korean Patent Application No. 10-2015-0119729.
Espacenet English Abstract for JP 2001-331494, published on Nov. 30, 2001.
Korean Office Action for Korean Patent Application No. 10-2015-0119729, dated Mar. 6, 2017.
Patent Abstracts of Japan, Publication No. 2005-295296, published Oct. 20, 2005.
Patent Abstracts of Japan, Publication No. 2007-335984, published Dec. 27, 2007.
Patent Abstracts of Japan, Publication No. 2008-176538, published Jul. 31, 2008.
Espacenet English Abstract, Publication No. I336207, Published Jan. 11, 2011.
Taiwanese Office Action dated Jul. 5, 2016 in corresponding Taiwanese Patent Application No. 104124765.
Tateyama, et al., "Scene Retrieval by Action Spotting," Information Processing Society of Japan, Jul. 24, 1997, vol. 97, No. 70, pp. 115-122.
Japanese Office Action dated Apr. 17, 2018, in corresponding Japanese Patent Application No. 2014-173150, 9 pgs.

* cited by examiner

| GAME ID | DATE-TIME | LOCATION | TEAMS | ... |
|---|---|---|---|---|
| 5022 | 20XX/XX/XX 18:00-21:30 | *** BALLPARK | TEAM A (BATTING FIRST) TEAM B (BATTING SECOND) | ... |
| ... | ... | ... | ... | ... |

51A

| TURN AT BAT EVENT ID | GAME ID | INNING | BATTING SEQUENCE | BATTER ID | PITCHER ID | TURN AT BAT RESULT |
|---|---|---|---|---|---|---|
| ... | ... | ... | ... | ... | ... | ... |
| 17 | 5022 | TOP OF FOURTH | 8 | 10001 | 12011 | CENTER FRONT HIT |
| 18 | 5022 | TOP OF FOURTH | 9 | 10002 | 12011 | RIGHT FRONT HIT |
| 19 | 5022 | TOP OF FOURTH | 1 | 10003 | 12011 | LEFT FRONT HIT. SCORE 1. |
| ... | ... | ... | ... | ... | ... | ... |

51C

| BATTER ID | PLAYER NAME | TEAM |
|---|---|---|
| 10001 | TAROU YAMADA | TEAM A |
| ... | ... | ... |

51D

| PITCHER ID | PLAYER NAME | TEAM | LEFT/RIGHT |
|---|---|---|---|
| 12011 | JIROU TANAKA | TEAM B | RIGHT HANDED PITCH |
| ... | ... | ... | ... |

FIG. 6

| FRAME TIME(s) | COMPOSITION DETERMINATION | BALL | STRIKE | OUT | RUNNER | SCORE (BATTING FIRST) | SCORE (BATTING SECOND) | INNING | PITCH TAG | TURN AT BAT TAG |
|---|---|---|---|---|---|---|---|---|---|---|
| ... | ... | ... | ... | ... | ... | ... | ... | ... | ... | ... |
| 128.1 | | 0 | 0 | 1 | 1,2 | 1 | 1 | TOP OF 4TH | | |
| 128.2 | | 0 | 0 | 1 | 1,2 | 1 | 1 | TOP OF 4TH | | START |
| 128.3 | TRUE | 0 | 0 | 2 | 1,2 | 1 | 1 | TOP OF 4TH | START | |
| 128.4 | TRUE | 0 | 0 | 2 | 1,2 | 1 | 1 | TOP OF 4TH | | |
| 128.5 | TRUE | 0 | 0 | 2 | 1,2 | 1 | 1 | TOP OF 4TH | | |
| ... | TRUE | ... | ... | ... | ... | ... | ... | ... | ... | ... |
| 129.7 | TRUE | 0 | 0 | 2 | 1,2 | 1 | 1 | TOP OF 4TH | | |
| 129.8 | TRUE | 0 | 1 | 2 | 1,2 | 1 | 1 | TOP OF 4TH | | |
| 130.0 | TRUE | 0 | 1 | 2 | 1,2 | 1 | 1 | TOP OF 4TH | | |
| 130.1 | | 0 | 1 | 2 | 1,2 | 1 | 1 | TOP OF 4TH | | |
| 130.2 | | 0 | 1 | 2 | 1,2 | 1 | 1 | TOP OF 4TH | | |
| 130.3 | | 0 | 1 | 2 | 1,2 | 1 | 1 | TOP OF 4TH | | |
| 130.4 | | 0 | 1 | 2 | 1,2 | 1 | 1 | TOP OF 4TH | | |
| 130.5 | | 0 | 1 | 2 | 1,2 | 1 | 1 | TOP OF 4TH | | |
| 130.6 | | 0 | 1 | 2 | 1,2 | 1 | 1 | TOP OF 4TH | | |
| 130.7 | TRUE | 0 | 1 | 2 | 1,2 | 1 | 1 | TOP OF 4TH | START | |
| 130.8 | TRUE | 0 | 1 | 2 | 1,2 | 1 | 1 | TOP OF 4TH | | |
| 130.9 | TRUE | 0 | 1 | 2 | 1,2 | 1 | 1 | TOP OF 4TH | | |
| 131.0 | TRUE | 0 | 1 | 2 | 1,2 | 1 | 1 | TOP OF 4TH | | |
| 131.1 | TRUE | 0 | 1 | 2 | 1,2 | 1 | 1 | TOP OF 4TH | | |
| 131.2 | TRUE | 0 | 1 | 2 | 1,2 | 1 | 1 | TOP OF 4TH | | |
| 131.3 | TRUE | 0 | 1 | 2 | 1,2 | 1 | 1 | TOP OF 4TH | | |
| ... | ... | ... | ... | ... | ... | ... | ... | ... | ... | ... |

Rows 128.3–130.0: PITCHING COMPOSITION SCENE
Rows 130.7–131.3: PITCHING COMPOSITION SCENE

FIG. 7

| FRAME TIME | INNING | OUT | RUNNERS | SCORE (BATTING FIRST) | SCORE (BATTING SECOND) | LEFT ON BASE (CUMULATIVE) | TURN AT BAT EVENT ID |
|---|---|---|---|---|---|---|---|
| ⋮ | ⋮ | ⋮ | ⋮ | ⋮ | ⋮ | ⋮ | ⋮ |
| 128.3 | TOP OF FOURTH | 2 | 2 (PLAYERS) | 1 | 1 | 5 | 17 |
| 213.6 | TOP OF FOURTH | 2 | 3 (PLAYERS) | 1 | 1 | 5 | 18 |
| 253.2 | TOP OF FOURTH | 2 | 3 (PLAYERS) | 2 | 1 | 5 | 19 |
| ⋮ | ⋮ | ⋮ | ⋮ | ⋮ | ⋮ | ⋮ | ⋮ |

FIG. 8

| FRAME TIME | ... | TURN AT BAT EVENT ID |
|---|---|---|
| ⋮ | ... | ⋮ |
| 128.3 | ... | 17 |
| 213.6 | ... | 18 |
| 253.2 | ... | 19 |
| ⋮ | ... | ⋮ |

DATA OF BASEBALL DATA DB 51

← ID: 17, BATTER: TAROU TANAKA, TURN AT BAT RESULT: CENTER FRONT HIT

← ID: 18, BATTER: ICHIROU SATOU, TURN AT BAT RESULT: RIGHT FRONT HIT

← ID: 19, BATTER: SABUROU SUZUKI, TURN AT BAT RESULT: LEFT FRONT HIT. SCORE 1.

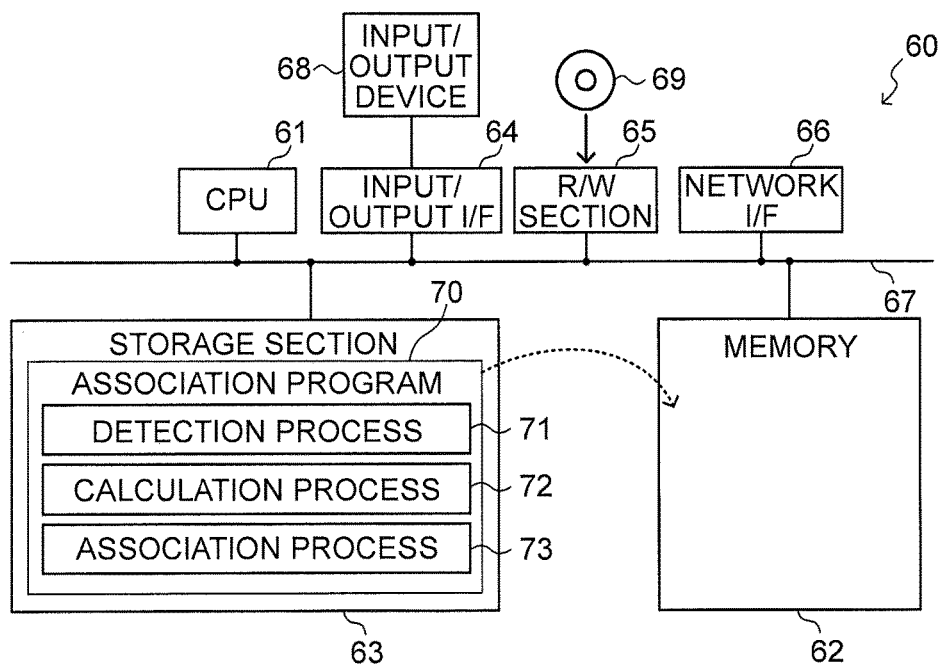
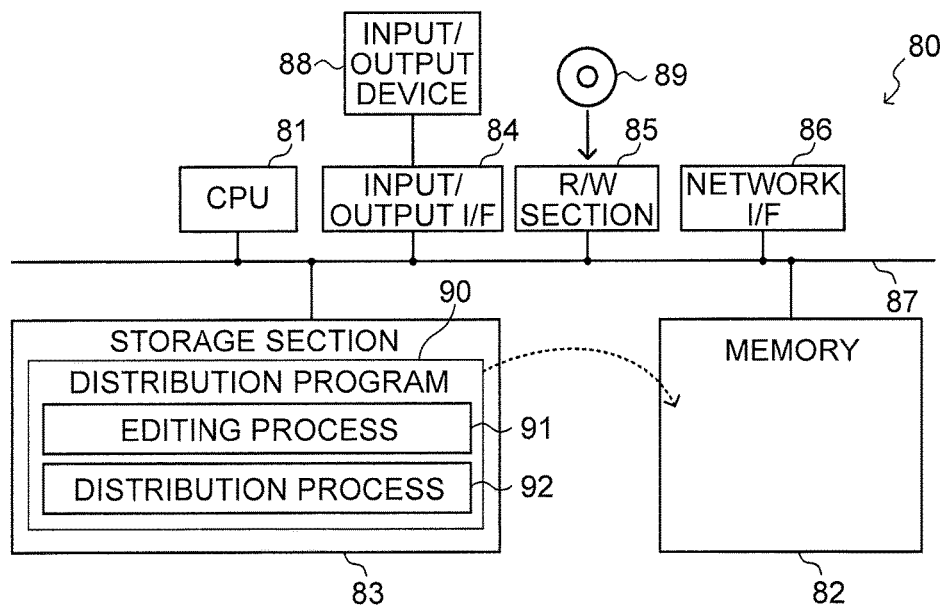

INFORMATION PROCESSING METHOD AND DEVICE

CROSS-REFERENCE TO RELATED APPLICATION

This application is based upon and claims the benefit of priority of the prior Japanese Patent Application No. 2014-173150, filed on Aug. 27, 2014, the entire contents of which are incorporated herein by reference.

FIELD

The embodiments discussed herein are related to a recording medium storing an information processing program, an information processing method, and an information processing device.

BACKGROUND

Known services exist in which captured baseball game footage is distributed live, and distributed as video-on-demand (VoD) content. During distribution as VoD content, for example, the viewer selects a desired inning, which is then presented to the viewer in a viewable form.

Various data related to baseball games, such as the result of each turn at bat, is provided.

Technology has been proposed to generate metadata related to footage content such as captured footage of a baseball game.

[Related Patent Documents]
Japanese Laid-Open Patent Publication No. 2008-176538

SUMMARY

According to an aspect of the embodiments, a non-transitory recording medium stores an information processing program that causes a computer to execute a process. The process includes detecting a turn at bat transition based on a change in any of an out count, a runner count, or a score that have been acquired from image information indicating a game situation included in captured footage of a baseball game stored in a storage section.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a baseball data database (DB);

FIG. 6 is a diagram illustrating an example of a frame information table;

FIG. 7 is a diagram illustrating an example of a turn at bat tag data table;

FIG. 8 is a diagram for explaining associating data of a baseball data DB with each frame in edited footage;

FIG. 11 is a schematic block diagram illustrating an example of a computer that functions as an association device;

FIG. 12 is a schematic block diagram illustrating an example of a computer that functions as a distribution device;

DESCRIPTION OF EMBODIMENTS

An example of an exemplary embodiment according to the technology disclosed herein is explained in detail below with reference to the drawings. In the present exemplary embodiment, explanation is given regarding an example of an information processing device according to the technology disclosed herein applied to a footage distribution system.

Figure 1:
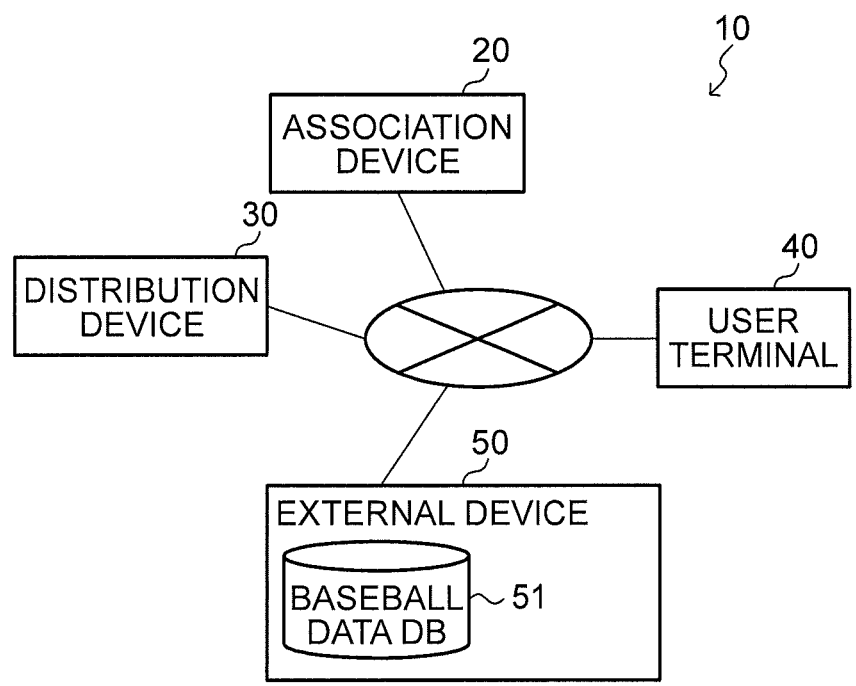
FIG. 1 is a block diagram illustrating a schematic configuration of a footage distribution system according to an exemplary embodiment.

As illustrated in FIG. 1, a footage distribution system 10 according to the present exemplary embodiment includes an association device 20, a distribution device 30, a user terminal 40, and an external device 50. The association device 20, the distribution device 30, the user terminal 40, and the external device 50 are connected to one another through a network. The association device 20 is an example of an information processing device of the technology disclosed herein.

The user terminal 40 is a device provided with a display section that displays footage, and an input section to which information is input, and the user terminal 40 is, for example, a personal computer (PC), a notebook PC, a tablet terminal, or a smartphone. Although only one user terminal 40 is illustrated in FIG. 1, there may be plural user terminals.

A baseball data database (DB) 51 recording various data related to baseball games is stored in the external device 50. An example of the baseball data DB 51 is illustrated in FIG. 2. In the example of FIG. 2, the baseball data DB 51 includes a turn at bat data table 51A, a game data table 51B, a batter data table 51C, and a pitcher data table 51D.

In the example of FIG. 2, the turn at bat data table 51A records a "game ID", an "inning", a "batting sequence", a "batter ID", a "pitcher ID", and a "turn at bat result" item associated with a "turn at bat event ID", this being identification information for identifying the respective turn at bat. Each record (each row) in the turn at bat data table 51A corresponds to data for a single turn at bat. The "turn at bat event ID" is a serial number appended to each turn at bat of each team and each game, from the start of the game onward.

The "game ID" is identification information for identifying the game that includes the turn at bat. The "inning" is information indicating to which inning time the turn at bat corresponds. The "batting sequence" is information indicating where the turn at bat is in the batting sequence, from first to ninth. The "batter ID" is identification information for identifying the batter of the turn at bat. The "pitcher ID" is identification information for identifying the pitcher of the opposing team of the turn at bat. The "turn at bat result" is information indicating the final result of the turn at bat in detail.

Information corresponding to the "game ID" of the turn at bat data table 51A is recorded in the game data table 51B. In the example of FIG. 2, items such as the "game ID", "date-time", "location", and "teams" are included in the game data table 51B, The "date-time" is the date and time that the game was played, and the "location" is the name of the ballpark or the like where the game was played. The "teams" is information indicating the teams competing in the game, distinguishing between the first team to bat and the second team to bat.

Information corresponding to the "batter ID" of the turn at bat data table 51A is recorded in the batter data table 51C. In the example of FIG. 2, the batter data table 51C includes the "batter ID", "player name", and "team" items. The "player name" is information indicating the name of the batter identified by the batter ID. The "team" is information indicating the team that the batter identified by the batter ID belongs to.

Information corresponding to the "pitcher ID" of the turn at bat data table 51A is recorded in the pitcher data table 51D. In the example of FIG. 2, the pitcher data table 51D includes the "pitcher ID", "player name", "team", and "left/right" items. The "player name" is information indicating the name of the pitcher identified by the pitcher ID. The "team" is information indicating the team that the pitcher identified by the pitcher ID belongs to. The "left/right" is information indicating whether the pitcher identified by the pitcher ID pitches left handed (left handed throw) or pitches right handed (right handed throw).

The tables included in the baseball data DB 51, and the items included in each of the tables are not limited to the example illustrated in FIG. 2, and may include other information. Moreover, there is no limitation to the data structure illustrated in the example of FIG. 2, and it is sufficient that data for each turn at bat is data recorded in a state enabling identification of the sequence number of the turn at bat.

Figure 3:
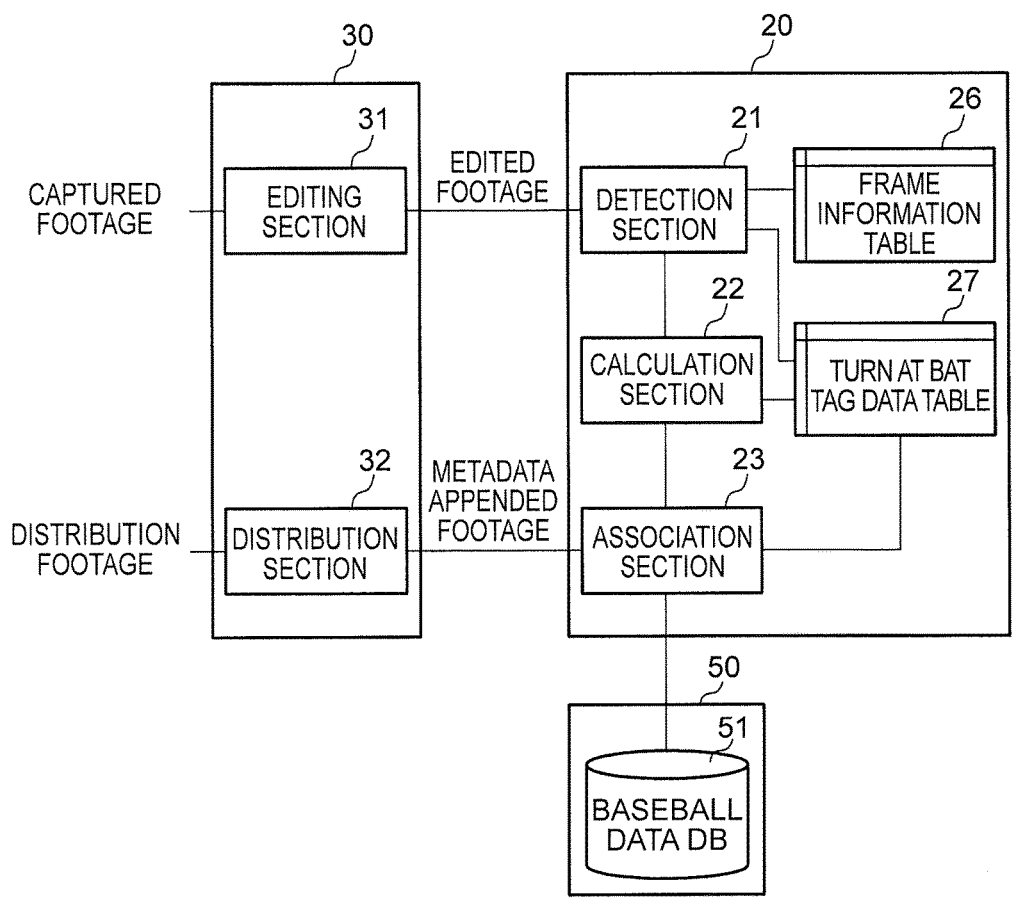
FIG. 3 is a functional block diagram of an association device and a distribution device according to the exemplary embodiment.

In the footage distribution system 10 the association device 20 associates data of the baseball data DB 51 stored in the external device 50 with the captured footage of a baseball game as metadata, and distributes the data to the user terminal 40 through the distribution device 30 and the network. As illustrated in FIG. 3, the association device 20 includes a detection section 21, a calculation section 22, and an association section 23. The detection section 21, the calculation section 22, and the association section 23 are examples of a detection section or an appending section of the technology disclosed herein. The distribution device 30 includes an editing section 31 and a distribution section 32.

First, detailed explanation is given regarding individual sections of the distribution device 30.

The editing section 31 acquires footage capturing a baseball game (referred to as "captured footage" hereafter). The captured footage is footage captured at a frame rate such as 30 fps, or 60 fps, and includes plural frames. Each frame is associated with a frame time indicating an elapsed time since the start of capture of the captured footage. In the present exemplary embodiment, frame times are employed as identification information of frames.

Figure 4:
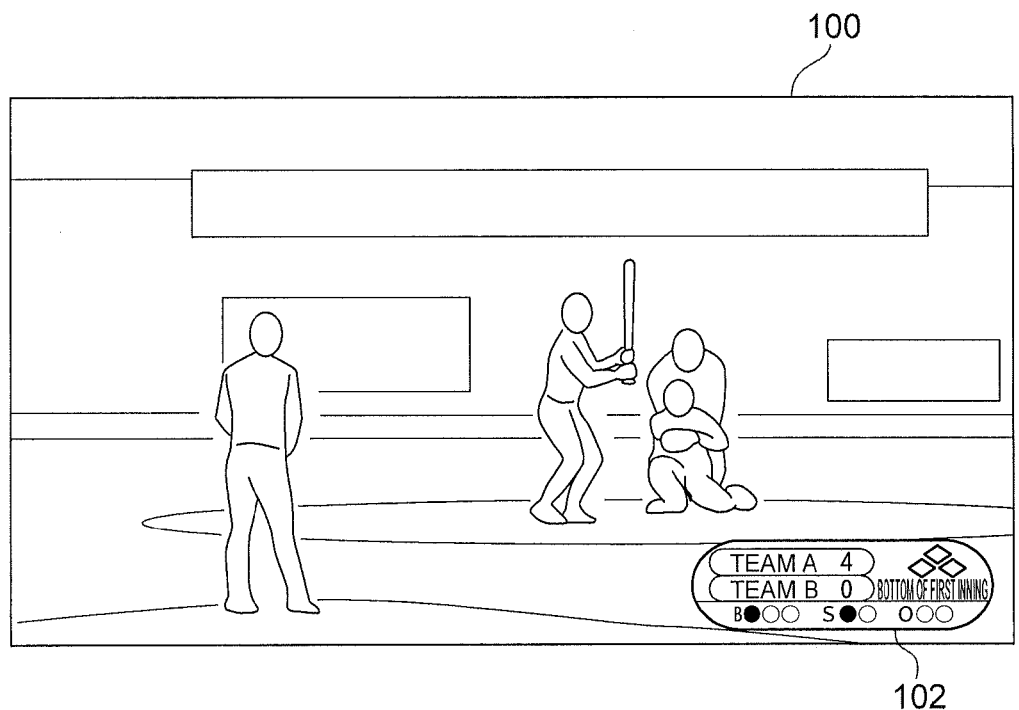
FIG. 4 is a diagram for explaining an example of a pitching composition frame and editing.

The editing section 31 applies editing commands, designated by operation of an operator using a display device and input device, not illustrated in the drawings, to the captured footage using image processing. As illustrated in FIG. 4, for example, the editing commands include adding a count display 102 that displays the game situation to each frame 100 corresponding to specified scenes in the captured footage.

Figure 5:
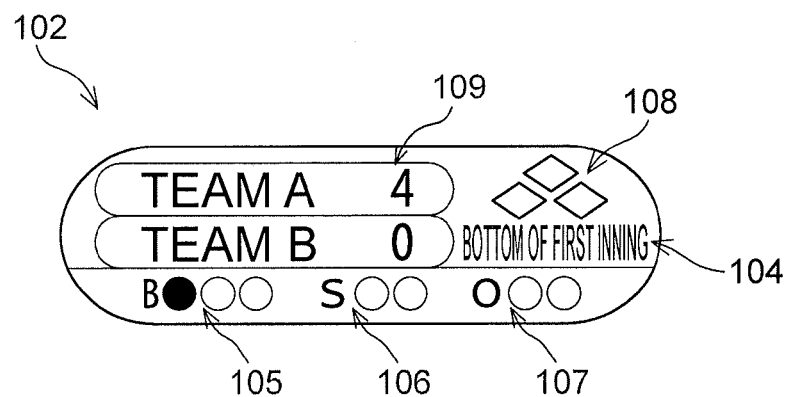
FIG. 5 is a diagram illustrating an example of a count display.

The count display 102 is a display that displays count information including an inning, a ball count, a strike count, an out count, a runner situation, and the current score for each team. For example, as illustrated in FIG. 5, the count display 102 includes an inning display 104 that displays the inning, a ball count display 105 that displays the ball count, and a strike count display 106 that displays the strike count. The count display 102 also includes an out count display 107 that displays the out count, a runner display 108 that displays the runner situation, and a score display 109 that displays the current score for each team. Note that the format of the count display 102 is not limited to the example in FIG. 5; any display displaying count information for at least the inning, out count, runner situation, and current score for each team is sufficient.

The editing commands are not limited to adding the count display 102, and may include various content such as adding an overlay displaying player information such as name and profile. Footage that is captured footage that has been edited by the editing section 31 is referred to as "edited footage" hereafter. The editing section 31 transmits the edited footage to the association device 20.

The distribution section 32 acquires footage to which metadata has been added by the association device 20 (referred to as "metadata appended footage" hereafter; detailed explanation is given below). The distribution section 32 converts metadata appended footage to distribution footage according to specified standards, and distributes the distribution footage to a distribution destination user terminal 40.

Next, detailed explanation is given regarding individual sections of the association device 20.

The detection section 21 acquires edited footage transmitted from the distribution device 30. The detection section 21 detects places representing divisions between turn at bats from the edited footage, and appends turn at bat tags indicating the divisions between turn at bats to the edited footage. The detection of places representing divisions between turn at bats may be detection from characteristics of each frame of the edited footage, or may be detection made manually. In the present exemplary embodiment, as an example, explanation follows of a case in which frames representing the start of a turn at bat are detected based on the composition and the count display 102 of each frame, and turn at bat tags are appended to those frames.

The detection section 21 detects from respective plural frames included in the edited footage, a frame having a composition captured at a camera angle used in a pitcher's pitching scene, as a pitching composition frame. In the present exemplary embodiment, explanation follows regarding a case in which the pitching composition frame is a frame having a composition captured in a direction toward the batter from behind the pitcher, as illustrated in FIG. 4.

Specifically, the detection section 21 extracts image characteristics for each frame. The image characteristics are characteristics represented by pixel information such as the luminance and color of each pixel inside the frame. The detection section 21 derives a similarity value between reference image characteristics extracted from a pre-prepared pitching composition frame, and extracted image characteristics extracted from each frame of the edited footage. The detection section 21 extracts as pitching composition frames any frames with extracted image characteristics having a similarity value to the reference image characteristics of a specified value or greater. For example, characteristics representing the composition (configuration) of the image, characteristics representing the placements and distributions of, for example, color and luminance, or characteristics obtained using wavelet transformation may be employed as the image characteristics.

The detection section 21 extracts the count display 102 from each frame, and detects count information displayed by the count display 102. For example, the detection section 21 extracts the count display 102 from a region within a frame predetermined to be a region displaying the count display 102. Alternatively, the count display 102 is extracted from within the frame by, for example, pattern matching using a predetermined format for the count display 102. The detection section 21 then identifies the region of the inning display 104 in the extracted count display 102 using, for example, pattern matching or optical character recognition processing, and detects the inning displayed by the inning display 104. Similarly, the detection section 21 detects the ball count form the ball count display 105, and detects the strike count from the strike count display 106. Moreover, the detection section 21 detects the out count from the out count display 107, detects the runner situation from the runner display 108, and detects the score from the score display 109.

The detection section 21 records the detection results of the pitching composition frames and the count information detected for each of the frames in a frame information table 26. FIG. 6 illustrates an example of the frame information table 26. In the example of FIG. 6, "composition determination", "ball", "strike", "out", "runner", "score (batting first), "score (batting second)", and "inning" items are included for each frame identified by a frame time. The detection section 21 records "TRUE" in the "composition determination" item corresponding to frames detected as pitching composition frames. The "composition determination" item is left blank for frames not detected as pitching composition frames. The detection section 21 records the ball count, the strike count, the out count, the runner situation, the scores, and the inning detected as count information in the respective corresponding items.

In FIG. 6 the frame time is displayed in 0.1 second divisions in order to simplify explanation. However, in the case of captured footage with a framerate of 30 fps for example, the frame times are in divisions of approximately 0.03 seconds, and in the case of captured footage with a framerate of 60 fps, the frame times are in divisions of approximately 0.017 seconds.

The detection section 21 references the frame information table 26 and identifies a group of frames formed from plural consecutive pitching composition frames as a pitching composition scene. The detection section 21 determines the start frame of the pitching composition scene as a frame representing the start of a pitch, and appends a "pitch tag" to the frame. When the ball count is 0 and the strike count is 0 in the frame representing the start of the pitch, the detection section 21 determines that the frame is a frame representing the start of a turn at bat, and appends a "turn at bat tag" to the frame. In the example of FIG. 6, frames having "start" recorded in the "pitch tag" item represent frames appended with the pitch tag, namely, frames representing the start of a pitch. Frames having "start" recorded in the "turn at bat tag" item represent frames appended with the turn at bat tag, namely, frames representing the start of a turn at bat.

For example, in the example of FIG. 6, the detection section 21 first identifies a scene represented by the group of frames included at frame times of from 128.3 to 130.0 as a pitching composition scene. The detection section 21 then determines the frame at frame time=128.3 that is the start frame of the pitching composition scene as a frame representing the start of a pitch. Moreover, since the ball count and the strike count are both 0 in the frame at frame time=128.3, the frame at frame time=128.3 is determined as a frame representing the start of a turn at bat. A scene represented by the group of frames included from frame time=130.7 onward is similarly identified as a pitching composition scene. The detection section 21 then determines the frame at frame time=130.7 that is the start frame of the pitching composition scene as a frame representing the start of a pitch. However, the frame at frame time=130.7 has a ball count of 0 and a strike count of 1, and is therefore not determined as a frame representing the start of turn at bat.

The calculation section 22 generates a turn at bat tag data table 27 that has extracted information for calculating the turn at bat sequence number from the frame information table 26. FIG. 7 illustrates an example of the turn at bat tag data table 27. The example of FIG. 7 includes "frame time", "inning", "out", "runner", "score (batting first)", "score (batting second)", "left on base (cumulative)", and the "turn at bat event ID" items. Each record (each row) in the turn at bat tag data table 27 corresponds to tag data related to respective turn at bats divided by turn at bat tags (referred to as "turn at bat tag data" hereafter).

Specifically, the calculation section 22 extracts a frame appended with a turn at bat tag by the detection section 21 from the frame information table 26, and records information indicating the frame time, inning, out count, score (batting first), and score (batting second) of the extracted frame in the turn at bat tag data table 27. The calculation section 22 also derives the number of runners from the runner situation recorded in the "runner" item of the frame information table 26, and records the number of runners in the "runner" item of the turn at bat tag data table 27. For example, if the runner situation recorded in the "runner" item of the frame information table 26 indicates that there are runners at first base and second base, "2" is recorded in the "runner" item of the turn at bat tag data table 27.

Moreover, the calculation section 22 records a cumulative value of the number of left on bases in each inning in the "left on base (cumulative)" item. The number left on base in each inning is a cumulative value of the number of players recorded in the "runner" item of the turn at bat tag data with the greatest frame time out of turn at bat tag data recorded with the same value in the "inning" item for each top or bottom of the inning.

Moreover, the calculation section 22 calculates a turn at bat sequence number indicating the sequence in which each turn at bat falls in the game for each team, based on the values recorded in each item out of "inning", "out", "runner", "score (batting first)", "score (batting second)", and "left on base (cumulative)". The calculation section 22 may, for example, calculate the sequence number of the turn at bat according to the equation below.

Sequence number of turn at bat={((numeric value of "inning")−1)×3+"left on base (cumulative)"+ 1}+"out"+"runner"+"score"

For the "score", the value of "score (batting first)" is employed for the "top" of the "inning", and value of the "score (batting second)" is employed for the "bottom" of the "inning". The calculation section 22 records the sequence number of the turn at bat calculated for each turn at bat in the "turn at bat event ID" item of the turn at bat tag data table 27.

Note that the method of calculating the sequence number of the turn at bat is not limited to the above, as long as the number of batters having made an appearance up until that turn at bat is calculated. For example, the sequence number of the turn at bat may be calculated according to the equation below.

Sequence number of turn at bat=(sequence number of final turn at bat in previous inning)+"out"+ "runner"+("score"−final "score" in previous inning)

The (sequence number of final turn at bat in previous inning) is the value recorded in the "turn at bat event ID" item of the turn at bat tag data having the greatest frame time out of the turn at bat tag data with the value of the previous inning recorded in the "inning" item. Similarly, the final "score" in the previous inning is the value recorded in the "score" item of the turn at bat tag data having the greatest frame time out of the turn at bat tag data having the value of the previous inning recorded in the "inning" item. The "value of the previous inning" is a value one lower than the value recorded in the "inning" of the turn at bat tag data to be calculated, with the same "top" or "bottom" distinction.

The association section 23 acquires the baseball data DB 51 from the external device 50, and associates (compounds) the baseball data DB 51 and the turn at bat tag data table 27 based on their respective turn at bat event IDs. As illustrated in FIG. 8, the data of the baseball data DB 51 that is existing external data can thereby be added to the edited footage as the metadata corresponding to each frame of the edited footage. In the example of FIG. 8, an example is illustrated in which the batter and turn at bat result of each turn at bat are added as metadata; however, other items may similarly be added as metadata. In the example of FIG. 8, the name of the batter is the player name associated with the "batter ID" of the turn at bat data table 51A of the baseball data DB 51, extracted from the batter data table 51C.

When associating the baseball data DB 51 and the turn at bat tag data table 27, the association section 23 may reference the "inning" information of both the baseball data DB 51 and the turn at bat tag data table 27, and make associations by inning. Associating the baseball data DB 51 and the turn at bat tag data table 27 by inning enables misalignments in the association to be inhibited from affecting subsequent innings when an append error, described below, occurs with a turn at bat tag.

In the present exemplary embodiment, turn at bat divisions are detected, and turn at bat tags appended, based on image characteristics of frames and information indicated by the count display 102 extracted from the frames. Therefore, in some cases, the turn at bat divisions are not completely detectable and turn at bat tag appending omissions occur, or places that are not turn at bat divisions are detected as divisions and turn at bat tag duplication occurs. This problem can similarly arise when turn at bat tags are appended manually.

Figure 9:
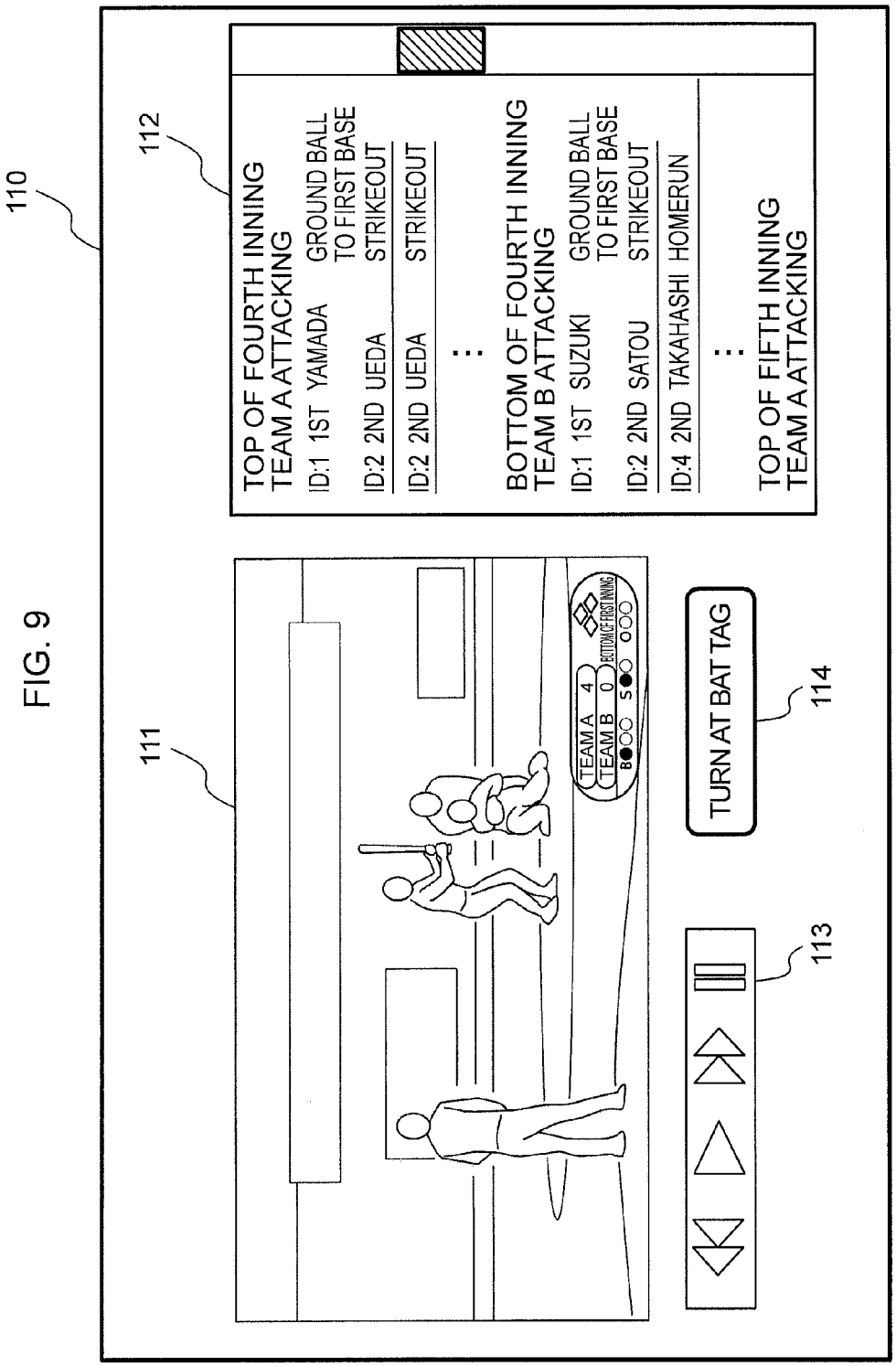
FIG. 9 is a diagram illustrating an example of a correction screen.

The association section 23 presents places where "turn at bat event ID" values have been skipped over or duplicated in the turn at bat tag data table 27 to an operator using a display device provided to the association device 20, and prompts turn at bat tag correction. For example, the association section 23 displays a correction screen 110 like that illustrated in FIG. 9 on the display device provided to the association device 20. In the example of FIG. 9, the correction screen 110 includes a footage playback region 111 that plays back edited footage, an associated data display region 112, and operation buttons 113 for performing operations such as footage playback, fast-forward, rewind, replaying one frame at a time, and pausing. The correction screen 110 also includes an append turn at bat tag button 114 for appending turn at bat tags to the frame displayed in the footage playback region 111.

Metadata of each turn at bat associated with the edited footage from the baseball data DB 51 is displayed in the associated data display region 112. The metadata displayed in the associated data display region 112 includes at least the turn at bat event ID, and may display other information for easily confirming the turn at bat tag. When data of a respective turn at bat displayed in the associated data display region 112 is selected, the association section 23 acquires the corresponding frame time from the turn at bat tag data table 27. Edited footage from the frame indicated by the acquired frame time onward is when played back in the footage playback region 111.

When displaying metadata in the associated data display region 112, the existence of append errors in the turn at bat tags is presented to the operator by, for example, emphatically displaying turn at bat data having a skipped over or duplicated turn at bat event ID. In the example of FIG. 9, turn at bat event ID=2 (denoted "ID:2" in FIG. 9, and similar applies for other turn at bat event IDs) is duplicated for team A. Moreover, turn at bat event ID=3 is skipped over for team B (the turn at bat event ID increases by 2 or more). In FIG. 9, turn at bats where turn at bat tag append errors are ascertained are displayed emphatically by underlining. Other than underlining as illustrated in FIG. 9, there are various conceivable modified examples of the mode of emphatic display, such as changing the text color, changing the text size, and changing the font.

When a turn at bat event ID is duplicated, it is conceivable that the turn at bat detection was duplicated as an erroneous detection. Accordingly, when the turn at bat event ID is duplicated, the association section 23 may display on the associated data display region 112 that an erroneous detection duplicating detection of a turn at bat has occurred. Moreover, it is conceivable that a turn at bat ID missed detection occurred when the turn at bat event ID increases by 2 or more compared to the previous turn at bat event ID. Accordingly, when the turn at bat event ID is missed detection, the association section 23 may display on the associated data display region 112 that a turn at bat missed detection has occurred as an erroneous detection. The association section 23 may also determine that erroneous detection has occurred when the turn at bat event ID decreases compared to the previous turn at bat event ID.

The operator of the association device 20, for example, confirms the footage by selecting the corresponding turn at bat data from the associated data display region 112 when the turn at bat event ID is duplicated. The operator erases the turn at bat data corresponding to the turn at bat tag append error from the associated data display region 112. The association section 23 erases the turn at bat tag data corresponding to the turn at bat data erased from the associated data display region 112 from the turn at bat tag data table 27. The turn at bat tag is thereby removed from the frame erroneously appended with a turn at bat tag.

When, for example, a turn at bat event ID is skipped over, the operator of the association device 20 confirms the footage by selecting the corresponding prior or subsequent turn at bat from the associated data display region 112. Then, the operator selects the append turn at bat tag button 114 in a state in which the frame representing the start of the turn at bat is displayed on the footage playback region 111. When the append turn at bat tag button 114 is selected, the association section 23 adds the frame time of the frame displayed on the footage playback region 111 to the turn at bat tag data table 27. The association section 23 then references the turn at bat event IDs associated with the prior or subsequent frame times in the turn at bat tag data table 27, and appends the turn at bat event ID to the added frame time.

The association section 23 remakes the associations with the baseball data DB 51 based on the turn at bat tag data table 27 after correction. Data of each turn at bat in the baseball data DB 51 is thereby associated with each frame appended with a turn at bat tag, namely, the frame time of each frame representing the start of a turn at bat, as metadata. The association section 23 transmits metadata appended footage to the distribution device 30.

The following modes of association may be made when making associations between the baseball data DB 51 and the turn at bat tag data table 27.

An association is made when a turn at bat event ID in the turn at bat tag data table 27 has increased by 1 compared to the previous turn at bat event ID.

Association processing is inhibited when a turn at bat event ID in the turn at bat tag data table 27 has not increased in value by 1 compared to the previous turn at bat event ID.

Examples of cases in which the turn at bat event ID does not increase in value by 1 compared to the previous turn at bat event ID include, as described above, a turn at bat event ID being duplicated, the turn at bat event ID increasing by 2 or more, and the turn at bat event ID decreasing. Inhibition of association processing may be inhibition for the portion for which the turn at bat event IDs do not increase in value by 1 compared to the previous turn at bat event ID. The association processing may be inhibited at a point in time when a turn at bat event ID that has not increased in value by 1 compared to the previous turn at bat event ID is detected in the association processing. This can thereby inhibit erroneous association processing accompanying an erroneously appended turn at bat event ID.

Figure 10:
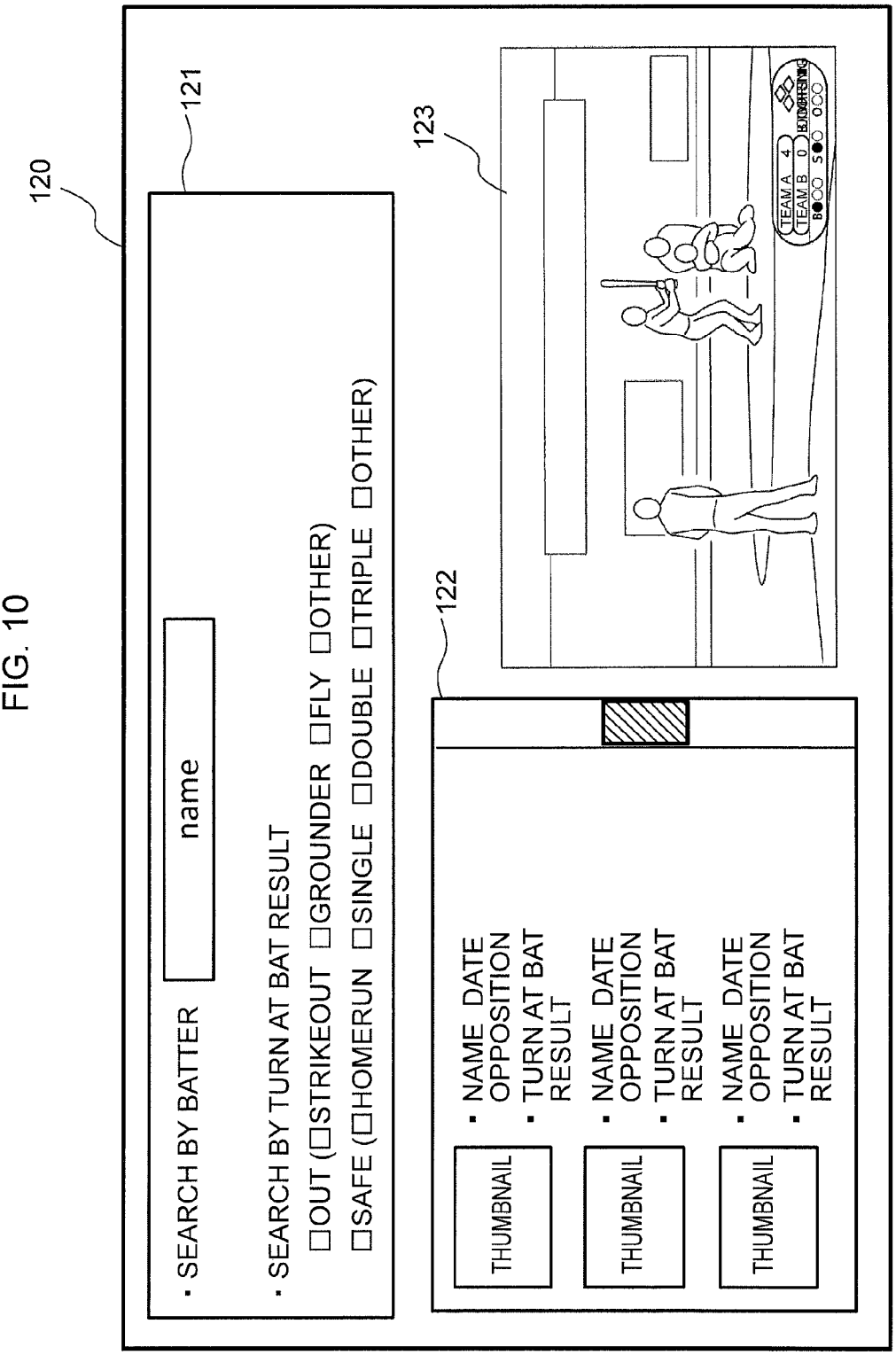
FIG. 10 is a diagram illustrating an example of a distribution screen.

When the metadata appended footage is converted to distribution footage by the distribution device 30 and distributed to the user terminal 40, the user terminal 40 displays a distribution screen 120 like that illustrated in FIG. 10 for example. The distribution screen 120 includes a search region 121 for searching for footage of turn at bats the user wants to watch, a listing display region 122 for displaying a list of search results, and a footage playback region 123 for playing back footage.

The search region 121 displays, for example, a textbox for performing searches for specified batter names, and checkboxes by turn at bat result for searching for selected turn at bat results. There is no limitation to this example, as long as the display of the search region 121 is a display capable of setting search conditions employing metadata added to the distribution footage.

The listing display region 122 displays a list of frames identified by frame times extracted by searching for metadata added to the distribution footage, with search conditions set by the search region 121 as a key. The list may include, for example, thumbnail images of the frames identified by the extracted frame times, and metadata associated with the extracted frame times.

The footage playback region 123 plays back footage representing a group of frames from a frame corresponding to a thumbnail image selected from the listing display region 122 to the frame before the frame appended with the next turn at bat tag.

The association device 20 may, for example, be implemented by a computer 60 illustrated in FIG. 11. The computer 60 includes a CPU 61, memory 62 serving as a temporary storage region, and a nonvolatile storage section 63. The computer 60 also includes an input/output interface (I/F) 64 connected to an input/output device 68 such as a display device or an input device. The computer 60 also includes a read/write (R/W) section 65 that controls reading and writing of data from and to a recording medium 69, and a network I/F 66 for connecting to a network such as the internet. The CPU 61, the memory 62, the storage section 63, the input/output I/F 64, the R/W section 65, and the network I/F 66 are connected to one another through a bus 67.

The storage section 63 may be implemented by a hard disk drive (HDD), solid state drive (SSD), flash memory, or the like. The storage section 63, serving as a storage medium, is stored with an association program 70 that causes the computer 60 to function as the association device 20. The CPU 61 reads the association program 70 from the storage section 63, expands the association program 70 into the memory 62, and sequentially executes processes of the association program 70.

The association program 70 includes a detection process 71, a calculation process 72, and an association process 73. The CPU 61 operates as the detection section 21 illustrated in FIG. 3 by executing the detection process 71. The CPU 61 operates as the calculation section 22 illustrated in FIG. 3 by executing the calculation process 72. The CPU 61 operates as the association section 23 illustrated in FIG. 3 by executing the association process 73. The computer 60 that executes the association program 70 thereby functions as the association device 20.

The distribution device 30 may be implemented by, for example, a computer 80 illustrated in FIG. 12. The computer 80 includes a CPU 81, memory 82, a nonvolatile storage section 83, and an input/output I/F 84 connected to an input/output device 88. The computer 80 also includes an R/W section 85 that controls reading and writing of data to and from a recording medium 89, and a network I/F 86 for connecting to a network such as the internet. The CPU 81, the memory 82, the storage section 83, the input/output I/F 84, the R/W section 85, and the network I/F 86 are connected to one another through a bus 87.

The computer 80 that implements the distribution device 30 and the computer 60 that implements the association device 20 are connected through the network I/F 86 of the computer 80, the network, and the network I/F 66 of the computer 60.

The storage section 83 may be implemented by a HDD, an SSD, flash memory, or the like. The storage section 83, serving as a storage medium, is stored with a distribution program 90 that causes the computer 80 to function as the distribution device 30. The CPU 81 reads the distribution program 90 from the storage section 83, expands the distribution program 90 into the memory 82, and sequentially executes processes included in the distribution program 90.

The distribution program 90 includes an editing process 91, and a distribution process 92. The CPU 81 operates as the editing section 31 illustrated in FIG. 2 by executing the editing process 91. Moreover, the CPU 81 operates as the distribution section 32 illustrated in FIG. 2 by executing the distribution process 92. Thus the computer 80 executing the distribution program 90 functions as the distribution device 30.

Note that the association device 20 and the distribution device 30 can respectively be implemented by, for example, a semiconductor integrated circuit, more specifically, by an application specific integrated circuit (ASIC), or the like.

Next, explanation is given regarding operation of the footage distribution system 10 according to the present exemplary embodiment. When the captured footage is input to the distribution device 30, the distribution device 30 executes editing processing illustrated in FIG. 13, and outputs the edited footage. Next, when the edited footage is input to the association device 20, the association device 20 executes association processing illustrated in FIG. 14, and outputs the metadata appended footage. Then, when the metadata appended footage is input to the distribution device 30, the distribution device 30 executes distribution processing illustrated in FIG. 15, and outputs the distribution footage. Each processing is described in detail below.

Figure 13:
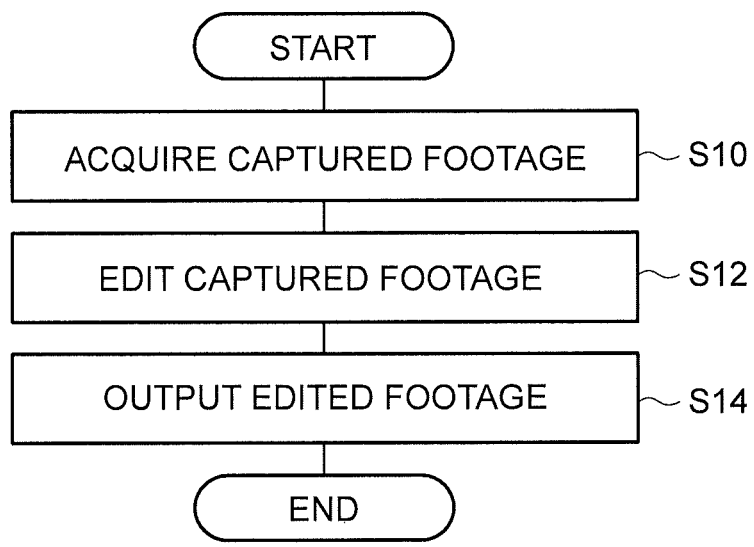
FIG. 13 is a flowchart illustrating an example of editing processing.

First, at step S10 of the editing processing illustrated in FIG. 13, the editing section 31 acquires the captured footage. Next, at step S12, the editing section 31 applies editing commands, designated by the operation of an operator using the input/output device 68, to the captured footage using image processing. Next, at step S14, the editing section 31 transmits the edited footage to the association device 20, and the editing processing ends.

Figure 14:
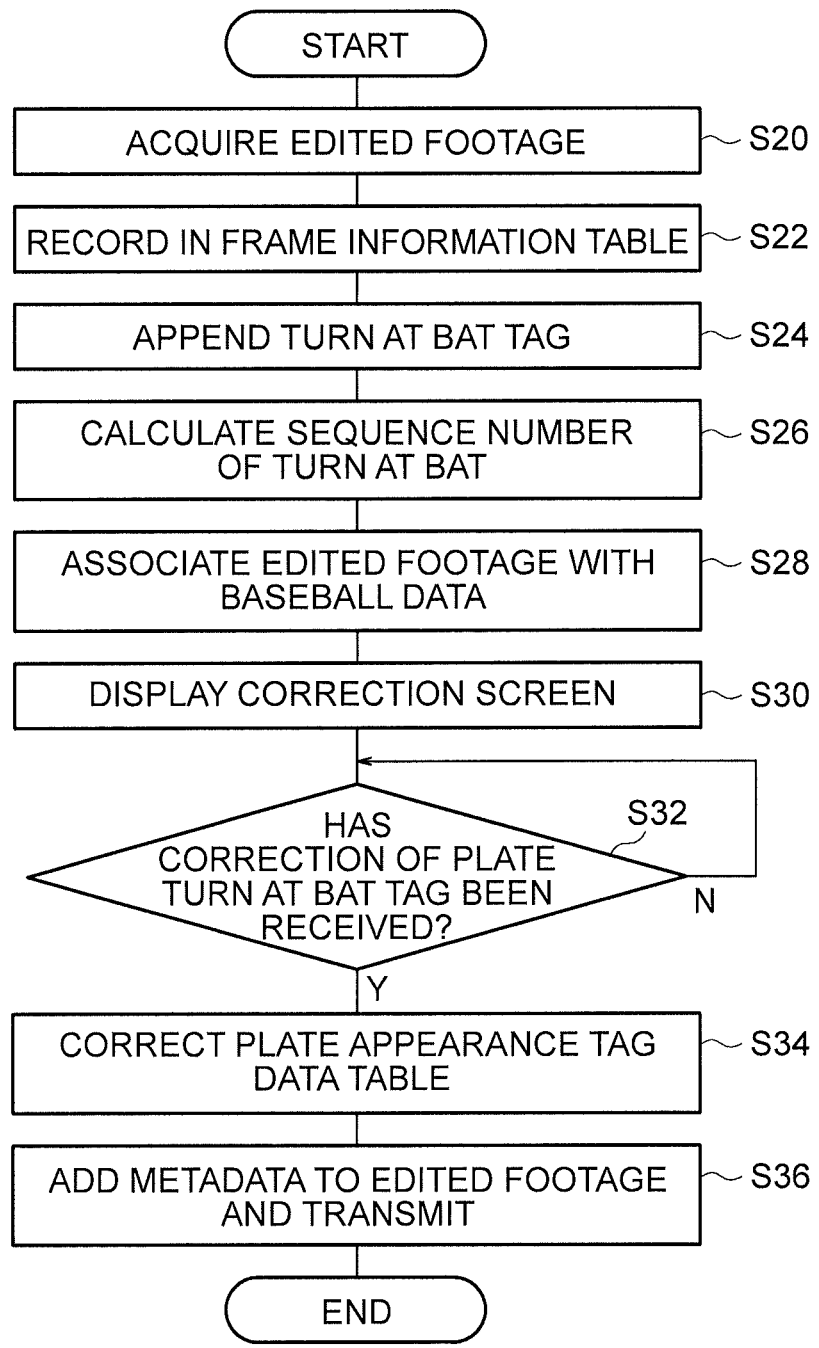
FIG. 14 is a flowchart illustrating an example of association processing.

Next, at step S20 of the association processing illustrated in FIG. 14, the detection section 21 acquires the edited footage transmitted from the distribution device 30.

Next, at step S22, the detection section 21 detects as pitching composition frames, frames having a composition captured at the camera angle employed in pitchers' pitching scenes from each of the plural frames included in the edited footage. The detection section 21 extracts the count display 102 from each frame, and detects the count information displayed by the count display 102. The detection section 21 records the detection result of the pitching composition frames, and the count information detected for each of the frames, in the frame information table 26.

Next, at step S24, the detection section 21 references the frame information table 26 and identifies a group of frames formed from plural consecutive pitching composition frames as a pitching composition scene. Then, the start frame of the pitching composition scene is determined as the frame representing the start of the pitch, and is appended with a "pitch tag". When the ball count is 0 and the strike count is 0 in the frame representing the start of the pitch, the detection section 21 moreover determines that the frame is a frame representing the start of a turn at bat, and appends a "turn at bat tag" to the frame.

Next, at step S26, the calculation section 22 generates the turn at bat tag data table 27, like that illustrated in FIG. 7 for example, of information extracted from the frame information table 26 for calculating the turn at bat sequence number. The calculation section 22 then calculates the sequence number of the turn at bat that indicates the sequence in which each turn at bat falls in the game for each team, based on the values recorded in each item out of the "inning", "out", "runner", "score (batting first)", "score (batting second)", and "left on base (cumulative)". The calculation section 22 records the turn at bat sequence number calculated for each turn at bat in the "turn at bat event ID" item of the turn at bat tag data table 27.

Next, at step S28, the association section 23 acquires the baseball data DB 51 from the external device 50, and associates the baseball data DB 51 with the turn at bat tag data table 27 based on their respective turn at bat event IDs.

Next, at step S30, the association section 23 presents places where a "turn at bat event ID" value has been skipped over or duplicated in the turn at bat tag data table 27, and displays the correction screen 110, like that illustrated in FIG. 9 for example, to prompt correction of the turn at bat tag.

When a turn at bat event ID is duplicated, the operator of the association device 20 presenting the correction screen 110 confirms the footage, and erases the turn at bat data corresponding to the turn at bat tag append error from the associated data display region 112. When a turn at bat event ID has been skipped over, the operator selects the append turn at bat tag button 114 at the place where appending a turn at bat tag is desired, while confirming the footage.

Next, at step S32, the association section 23 determines whether or not a turn at bat tag correction has been received from the operator. When a correction has not been received, the determination of the current step is repeated until a correction is received. When a correction has been received, processing transitions to step S34.

At step S34, the association section 23 erases the turn at bat tag data corresponding to the erased turn at bat data from the turn at bat tag data table 27 in cases in which a request to erase turn at bat data from the associated data display region 112 has been received. The association section 23 adds the frame time of the frame displayed on the footage playback region 111 to the turn at bat tag data table 27 when the append turn at bat tag button 114 is selected in cases in which selection of the append turn at bat tag button 114 is received. The association section 23 then references the turn at bat event IDs associated with the previous and subsequent frame times in the turn at bat tag data table 27, and appends the turn at bat event ID to the added frame time.

Next, at step S36, the association section 23 remakes the associations with the baseball data DB 51 based on the turn at bat tag data table 27 after correction, and transmits the metadata appended footage to the distribution device 30, and the association processing ends.

Figure 15:
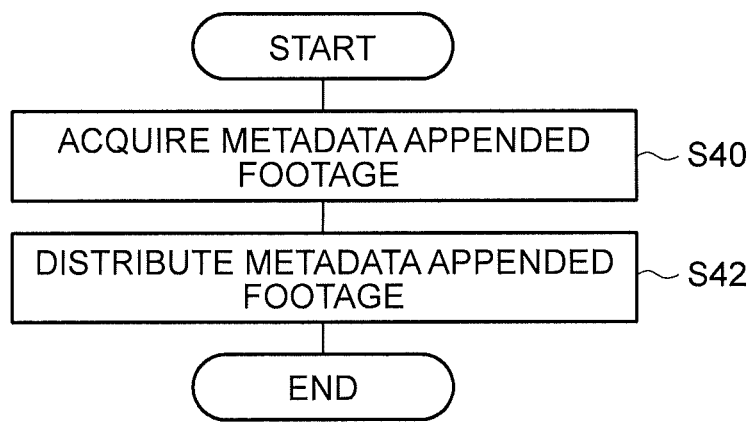
FIG. 15 is a flowchart illustrating an example of distribution processing.

Next, at step S40 of the distribution processing illustrated in FIG. 15, the distribution section 32 acquires the metadata appended footage transmitted from the association device 20. Next, at step S42, the distribution section 32 converts the metadata appended footage to distribution footage according to the specified standards, and distributes the distribution footage to the distribution destination user terminal 40, and distribution processing ends.

As explained above, in the association device 20 according to the present exemplary embodiment, a turn at bat event ID indicating the turn at bat sequence number calculated from the inning, out count, runner situation, scores, and the like is appended to the respective turn at bat tags indicating divisions between turn at bats appended to captured footage of a baseball game. Then, corrections to any turn at bat tag append errors are received by presenting turn at bat event IDs that were skipped over or duplicated. Existing external data can then be associated to the footage as metadata with high precision based on the turn at bat event ID appended to each turn at bat tag after correction, since data of respective turn at bats is associated with existing external baseball data recorded in turn at bat sequence.

Since external data can be utilized, detailed data for respective turn at bats can be added to footage as metadata for each turn at bat division. Accordingly, in the metadata appended footage according to the technology disclosed herein, not only is cueing from a turn at bat based on the metadata possible, but detailed search conditions can also be set, and footage of a desired turn at bat can be found and viewed.

Although explanation has been given in the exemplary embodiment described above of a case in which a frame captured in the batter-direction from behind the pitcher is considered to be the pitching composition frame, the pitching composition frame is not limited thereto. For example, it is sufficient that the pitching composition frame is a frame captured at a characteristic camera angle employed in pitchers' pitching scenes, such as a frame captured from a camera mounted to the head of the umpire (a frame captured from the umpire in the pitcher-direction).

The detection method of the turn at bat divisions is not limited to the example of the present exemplary embodiment, and detection may be made manually as described above, or detected by another detection method. Moreover, footage may be input to the association device already appended with turn at bat tags indicating turn at bat divisions. In such cases, processing that appends turn at bat tags to the footage may be omitted from the detection section 21.

Although explanation has been given in the exemplary embodiment described above of an example in which in the footage distribution system 10 includes a distribution device 30, and an association device 20, there is no limitation thereto. Each functional section of the distribution device 30, and each functional section of the association device 20 may be implemented by a single computer.

Moreover, the information processing device of the technology disclosed herein is not limited to application to a footage distribution system. For example, configuration may be made such that a footage file stored on an external storage device connected over a network is acquired, and existing external baseball data is associated with the footage file as metadata and stored again in the storage device. Moreover, the information processing device of the technology disclosed herein is also applicable to sports other than baseball, such as softball.

Although explanation has been given above of a mode in which the association program 70 is pre-stored (installed) on the storage section 63, and the distribution program 90 is pre-stored (installed) on the storage section 83, provision may be made in a recorded format on a recording medium, such as a CD-ROM, a DVD-ROM, or the like.

Associations are not made between existing external data and captured footage of a baseball game in the related technology.

One aspect of technology disclosed herein enables turn at bat transitions that can be associated with existing external data to be detected from captured footage of a baseball game.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the technology disclosed herein have been described in detail, it should be understood that the various changes, substitutions, and alterations could be made hereto without departing from the spirit and scope of the invention.

What is claimed is:

1. A non-transitory recording medium storing an information processing program that causes a computer to execute a process, the process comprising:
   detecting a turn at bat transition based on a change in any of an out count, a runner count, or a score that have been acquired from image information indicating a game situation included in captured footage of a baseball game stored in a storage section; and
   detecting that the turn at bat has transitioned in cases in which a sum of the out count, the runner count, and the score has increased by 1, and determining an erroneous detection of transition of the turn at bat in any case out of cases in which the sum has increased by 2 or more, cases in which the sum has decreased, or cases in which a plurality of turns at bat having the same sum are detected.

2. The non-transitory recording medium of claim 1, wherein, in the process, during detection of the turn at bat transition, the turn at bat transition is detected in cases in which any of the out count, the runner count, or the score has increased.

3. The non-transitory recording medium of claim 2, the process further comprising:
   determining that the turn at bat transition was erroneously detected when the runner count has increased by 2 or more.

4. The non-transitory recording medium of claim 2, the process further comprising:
   during detection of the turn at bat transition, determining an erroneous turn at bat transition detection in cases in which there is an increase that is higher than the runner count by a value of more than one in the change in any of the out count, the runner count, or the score.

5. The non-transitory recording medium of claim 1, wherein, in the process, a missed detection of the turn at bat transition is determined to have occurred in cases in which the sum has increased by 2 or more.

6. The non-transitory recording medium of claim 1, wherein, in the process, duplicate detection of the turn at bat is determined to have occurred in cases in which a plurality of turns at bat having the same sum are detected.

7. The non-transitory recording medium of claim 1, the process further comprising: appending, to the detected turn at bat transition, sequence information indicating a turn at bat sequence in the game in accordance with the sum.

8. The non-transitory recording medium of claim 4, the process further comprising:
   when erroneous detection is determined to have been made, outputting, to a display section, information indicating that erroneous detection has occurred and information of the turn at bat determined to have been erroneously detected.

9. The non-transitory recording medium of claim 8, wherein, in the process, information regarding the turn at bat determined to have been erroneously detected is selectably output to the display section, and the process further comprises:
   when the output information regarding the turn at bat has been selected, playing back captured footage corresponding to the selected turn at bat information at the display section.

10. An information processing method, comprising:
    detecting, by a processor, a turn at bat transition based on a change in any of an out count, a runner count, or a score that have been acquired from image information indicating a game situation included in captured footage of a baseball game stored in a storage section; and detecting, by a processor, that the turn at bat has transitioned in cases in which a sum of the out count, the runner count, and the score has increased by 1, and determining an erroneous detection of transition of the turn at bat in any case out of cases in which the sum has increased by 2 or more, cases in which the sum has decreased, or cases in which a plurality of turns at bat having the same sum are detected.

11. The information processing method of claim 10, wherein, during detection of the turn at bat transition, the turn at bat transition is detected in cases in which any of the out count, the runner count, or the score has increased.

12. The information processing method of claim 11, further comprising:

determining that the turn at bat transition was erroneously detected when the runner count has increased by 2 or more.

13. The information processing method of claim 11, further comprising:

during detection of the turn at bat transition, determining an erroneous turn at bat transition detection in cases in which there is an increase that is higher than the runner count by a value of more than one in the change in any of the out count, the runner count, or the score.

14. The information processing method of claim 10, wherein a missed detection of the turn at bat transition is determined to have occurred in cases in which the sum has increased by 2 or more.

15. The information processing method of claim 10, wherein duplicate detection of the turn at bat is determined to have occurred in cases in which a plurality of turns at bat having the same sum are detected.

16. The information processing method of claim 10, further comprising: appending, to the detected turn at bat transition, sequence information indicating the turn at bat sequence in the game in accordance with the sum.

17. The information processing method of claim 13, further comprising:

when erroneous detection is determined to have been made, outputting, to a display section, information indicating that erroneous detection has occurred and information of the turn at bat determined to have been erroneously detected.

18. A non-transitory recording medium storing an information processing program that causes a computer to execute a process, the process comprising:

appending second serial number information to a turn at bat scene included in captured footage of a baseball game stored in a storage section, in accordance with a sum of an out count, a runner count, and a score, that are acquired from image information indicating the game situation included in the captured footage; and using the second serial number information appended to the turn at bat scene as a key for associating the turn at bat scene and turn at bat information regarding each turn at bat of the game, the turn at bat information including first serial number information indicating a turn at bat sequence in the game.

* * * * *